US012681330B2

(12) United States Patent　　　(10) Patent No.:　US 12,681,330 B2
MacGuffie　　　　　　　　　　　　(45) Date of Patent:　　　Jul. 14, 2026

(54) LENSES, EYEWEAR, AND METHODS FOR ENHANCING PERCEPTION OF VISUAL LIGHT

(71) Applicant: Scott T. MacGuffie, Glens Falls, NY (US)

(72) Inventor: Scott T. MacGuffie, Glens Falls, NY (US)

( * ) Notice: Subject to any disclaimer, the term of this patent is extended or adjusted under 35 U.S.C. 154(b) by 0 days.

(21) Appl. No.: 19/371,428

(22) Filed: Oct. 28, 2025

(65) Prior Publication Data

US 2026/0126672 A1　　　May 7, 2026

Related U.S. Application Data

(60) Provisional application No. 63/765,079, filed on Feb. 28, 2025, provisional application No. 63/713,555, filed on Oct. 29, 2024.

(51) Int. Cl.
G02C 7/10　　　　　(2006.01)

(52) U.S. Cl.
CPC ............... G02C 7/10 (2013.01); G02C 7/104 (2013.01); G02C 7/108 (2013.01)

(58) Field of Classification Search
None
See application file for complete search history.

(56) References Cited

U.S. PATENT DOCUMENTS

| | | | |
|---|---|---|---|
| 5,135,298 A | 8/1992 | Feltman | |
| 6,334,680 B1 * | 1/2002 | Larson ................... | G02C 7/108 351/159.56 |

| | | | |
|---|---|---|---|
| 6,604,824 B2 | 8/2003 | Larson | |
| 6,773,816 B2 | 8/2004 | Tsutsumi | |
| 7,106,509 B2 | 9/2006 | Sharp | |
| 7,775,659 B2 | 8/2010 | Nesty | |
| 8,210,678 B1 * | 7/2012 | Farwig ..................... | G02B 5/22 351/159.65 |
| 8,733,929 B2 | 5/2014 | Chiou et al. | |
| 9,891,448 B2 | 2/2018 | Carlson et al. | |
| 10,571,719 B1 | 2/2020 | Mccabe et al. | |
| 10,642,071 B2 | 5/2020 | Carlson et al. | |
| 2019/0235282 A1 | 8/2019 | Coppa | |

(Continued)

OTHER PUBLICATIONS

International Search Report from corresponding PCT application PCT/US2025/052831, dated Jan. 29, 2026, 3 pages.

(Continued)

*Primary Examiner* — Darryl J Collins
(74) *Attorney, Agent, or Firm* — Tech Valley Patent, LLC; John Pietrangelo

(57) ABSTRACT

Lenses and eyewear are provided having enhanced or reduced transmittance of green light which can enhance the optical experience of various activities, including golfing and fishing. The improved lenses and eyewear are characterized by the presence of compounds within or upon the lenses that limit the transmittance of certain wavelengths of light while allowing the transmittance of other wavelengths of light. The compounds may typically be one or more optical dyes that are chosen for their absorption spectra to limit the transmittance or enhance the transmission of certain wavelengths of light. Methods for enhancing the visual experience and methods of fabricating the lenses are also disclosed.

20 Claims, 10 Drawing Sheets

*70*

(56)                     References Cited

U.S. PATENT DOCUMENTS

| | | | | |
|---|---|---|---|---|
| 2019/0256711 A1* | 8/2019 | Enomura | ................. | G02B 5/20 |
| 2020/0096792 A1 | 3/2020 | Mccabe et al. | | |
| 2022/0197063 A1* | 6/2022 | Matsui | .............. | C08G 18/3876 |
| 2023/0033949 A1* | 2/2023 | Boyles | .................... | G02C 7/10 |
| 2023/0204982 A1 | 6/2023 | Boyles | | |
| 2024/0176164 A1* | 5/2024 | Takenaka | .............. | G02B 1/041 |
| 2024/0329429 A1 | 10/2024 | Guillot | | |
| 2025/0164825 A1* | 5/2025 | Lin | ........................ | G02C 7/104 |

OTHER PUBLICATIONS

Written Opinion from corresponding PCT application PCT/US2025/052831, dated Jan. 29, 2026, 9 pages.
Cooksey, Catherine, "Key Comparisons: Transmitting Correct Measures All Around the World," https://www.nist.gov/blogs/taking-measure/key-comparisons-transmitting-correct-measuresall-around-world, Dec. 9, 2020.
Reichow, et al., "Ultraviolet and Short Wavelength Visible Light Exposure: Why Ultraviolet Protection Alone is Not Adequate," Journal of Long-Term Effects of Medical Implants, Feb. 2006, pp. 315,325, Feb. 2006.
Jondo Sport—Krisp Extreme Technology—https://jondo.humint.co.za/about—Undated, Downloaded Feb. 19, 2026, 8 pages.
Birdies & Bogies-Golf & Gear, "Jondo Golf Glasses,"—https://birdiesandbogeysgolfgear.com/collections/the-jondo-golf-sunglasses, Undated, Downloaded Feb. 19, 2026, 4 pages.

* cited by examiner

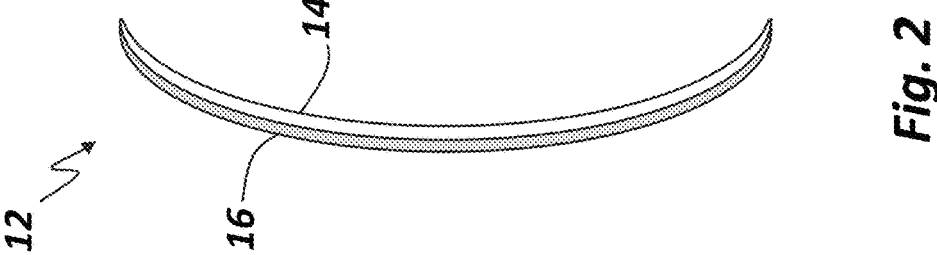
*Fig. 2*
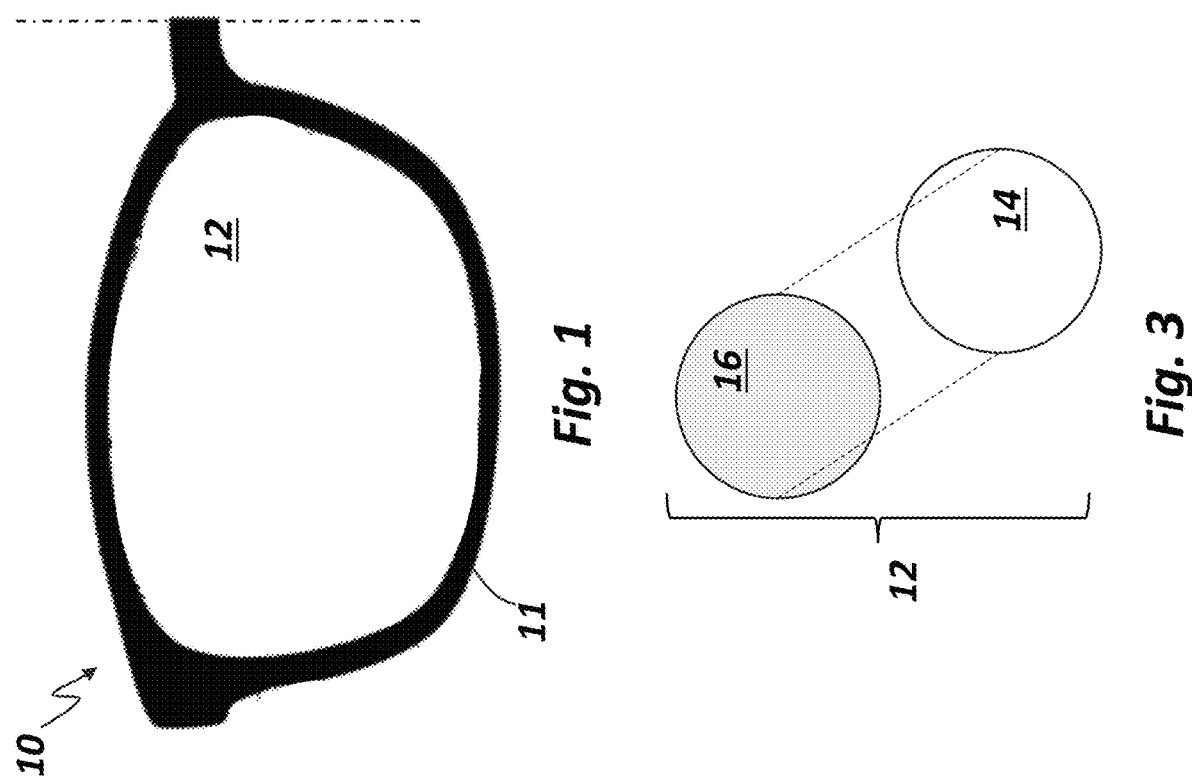
*Fig. 1*
*Fig. 3*

LENSES, EYEWEAR, AND METHODS FOR ENHANCING PERCEPTION OF VISUAL LIGHT

CROSS-REFERENCE TO RELATED APPLICATIONS

This application claims priority from U.S. Provisional Patent Application 63/713,555, filed on Oct. 29, 2024, and from U.S. Provisional Patent Application 63/765,079, filed on Feb. 28, 2025, the disclosures of which are incorporated by reference herein in their entirety.

BACKGROUND OF THE INVENTION

Technical Field

The present invention generally relates to lenses and eyewear, such as, sunglasses. More particularly, the present invention relates to lenses providing specific light filtering characteristics that selectively filter or enhance green wavelengths of light, and may enhance the transmission of non-green wavelengths of light to enhance visual perception by the wearer or detection by an optical device.

Description of Related Art

Tinted optical lenses, for example, sunglasses, are often used to protect a wearer's eyes from undesirable ambient light and glare. As known in the art, the tint or coloring of the lens can decrease the amount of light transmitted through the lens, while the lens can be treated with various films, coatings, or treatments to minimize undesirable glare, for example, using polarizing coatings.

As known in the art, the optical light spectrum of the electromagnetic spectrum, that is the light detectable by the human eye, is typically defined as electromagnetic radiation between wavelengths of approximately 380 nanometers [nm] and 740 nm. Below 380 nm the radiation is referred to as ultraviolet light and above 740 nm, the radiation is referred to as infrared light. Between these two limits lies the well-known blue-green-yellow-orange-red (ROYGBIV) spectrum that characterizes rainbows and oil spills.

Due to the discontinuous nature of the visual color spectrum, the perception of color by the human eye is a complex phenomenon. The perception of the overlapping bands of color in the visual spectrum can make it difficult for the human eye and the human brain to contrast overlapping ranges of visual color. For example, though the wavelengths of the bands of colors in the visual spectrum may vary slightly, the color wavelength bands are typically defined as blue light: 450-500 nanometers [nm]; green light: 500-570 nm; orange-yellow light: 570-620 nm; and red light: 620-750 nm. Viewing a rainbow in the sky clearly indicates that these ranges are not distinct. Accordingly, it is understood that the human eye and brain can have difficulty contrasting colors, and this difficulty may be manifested in difficulty in clearly perceiving colors.

As known in the art, the term "transmittance" refers to the effectiveness of a medium for transmitting radiant energy, for example, visible light. Transmittance may typically be provided as a ratio of the power of the incident radiation to the power of the radiation transmitted, for example, as defined in American National Standards Institute (ANSI) standard ANSI Z80.3-2018 "Ophthalmics—Nonprescription Sunglass and Fashion Eyewear Requirements," which is included by reference herein. This ratio of transmittance is typically expressed as a percent [%]. For example, a substantially transparent medium may typically have a transmittance of substantially 100%, that is, allowing substantially all the incident visible light to pass through the medium. An opaque medium may typically have a transmittance of substantially 0%, that is, allowing substantially no incident visible light to pass through the medium. Accordingly, translucent media have a transmittance somewhere between these extremes.

Though the optical spectrum spans from 380 nm to 740 nm, studies have found that human color vision may be characterized by three color channels: red (having an intensity at about 610 nm), green (having a intensity at about: 540 nm), and blue (having a intensity at about: 450 nm). Based on the level of light detected at each of these three channels at the eye, the brain interprets the colors seen. However, studies have also shown that the human eye has poor chromatic response at about wavelengths of 480 nm and about 580 nm. As known in the art, "poor chromatic response" means that the human eye has difficulty perceiving distinctions in color at these wavelengths due an inability of the eye to distinguish color or confuse colors at or near these wavelengths.

The poor chromatic response at the 480 nm wavelength roughly corresponds to where the spectra of the green-light band and the blue-light band overlap. The poor chromatic response at the 580 nm wavelength roughly corresponds to where the spectra of the green-light band and the red-light band overlap. Light at these wavelengths, 480 nm and 580 nm, may inhibit proper interpretation of colors by the human brain, causing color confusion, that is, the reduced ability to accurately identity the color of the radiation received by the eye. Since these wavelengths, 480 nm and 580 nm, are recognized for their poor chromatic response, it can be useful to reference these wavelengths when evaluating and contrasting the visual characteristics of lenses.

By recognizing the potential to enhance color recognition and reduce color confusion, aspects of the present invention provide improved lenses, eyewear having the lenes, and optical devices having one of the lenses that overcome the limitations and disadvantages of the prior art.

SUMMARY OF THE INVENTION

According to aspects of the invention, lenses and eyewear having the lenses are provided that can improve color recognition and contrast for the wearer or for a device having at least one of the lenses. In one aspect, the lenses may be referred to as optical lenses. In one aspect, a method of enhancing perception, for example, optical perception, of visual light by the user or device is also provided.

According to aspects of the invention, lenses are provided, for example, eyewear lenses, that enhance specific parts of the visible light spectrum to improve, for example, color recognition and contrast. As known in the art, visible light contrast refers to the difference in brightness or color between two or more objects or regions, as perceived by the human eye in the visible light spectrum (approximately 380 nanometers [nm] to 740 nm). Contrast can be essential in distinguishing objects from their backgrounds and can be influenced by factors such as light intensity, color, texture, and the specific wavelengths of light involved.

As recognized in the art, there are two main types of contrast in visible light: 1) Luminance contrast: The difference in brightness between objects or region; and 2) Color contrast: The difference in color or wavelength composition between objects or regions. In the context of optics, visible light contrast can affect visibility, readability, and visual comfort, particularly important in eyewear designed for specific environments, such as safety goggles, sunglasses, or glasses used in LED lighting for cultivation. These and further features of visible light contrast according to aspects of the invention are provided by the International Commission on Illumination (CIE) documents on the science of light and lighting, including contrast perception; ISO 9241-302: 2008 which provides guidelines on ergonomic requirements for contrast in visual displays; and ANSI Z87.1 standards which focus on the optical performance and contrast requirements for protective eyewear. These three references are included by reference herein in their entirety.

For example, in one aspect, eyeglasses or sunglasses having lenses as disclosed herein may be worn while performing an outdoor sport, such as, golf, fishing, or tennis, to provide enhanced color recognition and color contrast, that may, for example, provide for better "reading" of putting surfaces on a golf green. For example, while putting on a green, which, it is hoped, are predominantly green in color, the lenses disclosed herein may filter out or enhance at least some of the green light wavelengths and may filter out or enhance other colors that contrast with green and provide an enhanced visual perception of the surface of the putting green and thus a better understanding of the "lie" and of the approach to the cup. It will be apparent to others in the art that enhanced putting green appearance is only one of the multitude of applications for the lenses, eyewear, and methods disclosed herein.

Specifically, lenses according to aspects of the invention provide at least some filtering of or enhancement of the green wavelengths of visual light within the visual spectrum of 500-570 nm. This filtering or enhancement in the green light perceived, for example, by the human eye, decreases the contrast of green hues and, for example, may reduce the perceived green-color dominance of, for example, the green-colored putting surface.

In addition to filtering or enhancement of green wavelengths of light, aspects of the invention, may allow the transmission, or reduce the filtering of, or enhance at least one non-green visual light that otherwise may contrast with the green light of, for example, a putting green. The enhancing of at least one, but also more than one, non-green wavelength of light may enhance the contrast of the green light, where, for example, the surface contour, surface slopes, surface undulations, and objects (such as, golf balls, markers, and debris) on the green-colored putting green become more pronounced or stand out to the viewer, such as, to the golfer. As known in the art, though specific wavelength ranges may vary, this non-green visual light includes blue light having a wavelength of 450-500 nm; yellow-orange light having a wavelength of 570-620 nm; and red light having a wavelength of 620-740 nm.

One embodiment of the invention is a lens comprising or including: a lens wafer; and a compound overlaying the lens wafer or embedded in the lens wafer, the compound comprising one or more dyes; wherein the one or more dyes are selected to impart light transmittance characteristics such that the lens exhibits a light transmittance at 550 nm that is greater than 30%, and greater than a transmittance at 480 nm and greater than a transmittance at 580 nm. In one aspect, the one or more dyes may comprise a first dye adapted to limit light transmittance between 460 nm and 520 nm and a second dye adapted to limit light transmittance between 565 nm to 625 nm. In one aspect, the first dye comprises 0.01 to 1 grams of dye per kilogram of the lens wafer and the second dye may comprises 0.01 to 1 gram of dye per kilogram of the lens wafer, for example, a polymer. In another aspect, the first dye may comprise 0.05 to 0.5 grams of dye per kilogram the lens wafer and the second dye comprises 0.05 to 0.5 grams of dye per kilogram of the lens wafer.

In one aspect, the first dye is adapted to limit light transmittance between 470 nm and 510 nm and the second dye is adapted to limit light transmittance between 575 nm and 615 nm. In another aspect, the first dye is adapted to limit light transmittance between 480 nm and 500 nm, for example, at or near 490, and the second dye is adapted to limit light transmittance between of 585 nm to 605 nm, for example, at or near 595 nm.

In one aspect, the lens wafer may comprise a polymer, for example, a polycarbonate, a polyamide, a polymethyl methacrylate, a cyclic olefin copolymer, or a bio-based thermoplastic.

In one aspect, the one or more dyes may be further be adapted to provide the light transmittance at 550 nm that is at least 10% transmittance greater, or at least 15% transmittance greater, than the light transmittance at 480 nm.

In one aspect, the one or more dyes may further be adapted provide a light transmittance at the extremities of a light bandwidth of 500 nm to 570 nm that is less than a light transmittance between 520 nm and 560 nm. In another aspect, the one or more dyes may further be adapted to provide a light transmittance at the extremities of the light bandwidth 500 nm to 570 nm that are less than the light transmittance at 550 nm.

In one aspect, the one or more dyes may further be adapted to provide the light transmittance at 550 nm that is greater than 40%, for example, between 40 and 50%.

According to aspects of the invention, the lens disclosed herein may provide enhanced contrast for the wearer for light in the bandwidth of 500 nm to 570 nm, or for light in the bandwidth of 520 nm and 560 nm. For example, the lens may provide enhanced contrast for the wearer for light at 550 nm, for instance, for outdoor activity such as, for a golfer or fisherman.

Another embodiment of the invention is a lens comprising or including: a polymer; and one or more dyes embedded in the polymer; wherein the one or more dyes are selected to impart light transmittance characteristics such that the lens exhibits a light transmittance at 550 nm that is greater than 30%, and greater than a transmittance at 480 nm and greater than a transmittance at 580 nm. In one aspect, the one or more dyes may comprise a first dye adapted to limit light transmittance between 460 nm and 520 nm and a second dye adapted to limit light transmittance between 565 nm to 625 nm. In one aspect, the first dye may comprise 0.01 to 1 grams of dye per kilogram of polymer and the second dye may comprise 0.01 to 1 gram of dye per kilogram of polymer. In another aspect, the first dye may comprise 0.05 to 0.5 grams of dye per kilogram of polymer and the second dye may comprise 0.05 to 0.5 grams of dye per kilogram of polymer.

Another embodiment of the invention is a method for enhancing perception of visual light, the method comprising or including: receiving visual light on a surface of a lens comprising or including: a lens wafer; and a compound overlaying the lens wafer or embedded in the lens wafer; wherein the compound is configured to impart light transmittance characteristics such that the lens exhibits a light transmittance at 550 nm that is greater than 30%, and greater than the transmittance at 480 nm and greater than the transmittance at 580 nm; allowing the visual light to pass through the lens; and with the lens, filtering at least some of the visual light passed through the lens to reduce a transmittance of a light bandwidth of 500 nm to 570 nm. In one aspect, the compound used in the method may comprise one or more dyes, a first dye adapted to limit light transmittance between 460 nm and 520 nm, for example, at or about 490 nm, and a second dye adapted to limit light transmittance between 565 nm to 625 nm, for example, at or about 595 nm. In one aspect, the amount of the first and the second dyes used in the method may comprise 0.01 to 1 grams of dye per kilogram of the lens wafer, for example, the first and the second dye may comprise 0.05 to 0.5 gram of dye per kilogram of the lens wafer.

In one aspect, the lens wafer used in the methods may be a polymer, for example, a polycarbonate, a polyamide, a polymethyl methacrylate, a cyclic olefin copolymer, or a bio-based thermoplastic.

In one aspect, the method may further include mounting the lens in an eyeglass frame.

A further embodiment of the invention is a method of fabricating a lens, the method comprising or including: providing a plurality of dyes which limit light transmittance between 460 nm and 520 nm and limit light transmittance between 565 nm to 625 nm; combining the plurality of dyes with a fluid polymer to form a mixture of the fluid polymer and the plurality of dyes; inserting the mixture of the fluid polymer and the plurality of dyes into a mold; and allowing the mixture of the fluid polymer and the plurality of dyes to at least partially cure, for example, substantially completely cure, in the mold to form a desired lens shape; and after at least partially curing in the mold, removing the at least partially cured mixture of the fluid polymer and the plurality of dyes to provide the lens. In one aspect, the method may further include, after providing the plurality of dyes, premixing the plurality of dyes. In one aspect, combining the plurality of dyes with the fluid polymer comprises mixing the plurality of dyes with the fluid polymer. In one aspect, inserting the mixture of the fluid polymer and the plurality of dyes into the mold comprises injection molding.

In another aspect, the method may further include applying a scratch-resistant coating to the lens, applying a reflective coating to the lens, or applying a photochromic coating to the lens.

In one aspect, the fluid polymer used in the method may be a fluid polycarbonate, a fluid polyamide, a fluid polymethyl methacrylate, a fluid cyclic olefin copolymer, or a fluid bio-based thermoplastic.

Another embodiment of the invention is a lens comprising or including a lens wafer; and a compound overlaying or included in the lens wafer; wherein the compound is configured to impart light transmittance characteristics such that the lens exhibits a light transmittance at 550 nm (for example, green) that is less than the transmittance at 480 nm and less than the transmittance at 580 nm. In one aspect, the compound may further be configured wherein a light transmittance at 700 nm (for example, red) is greater than the light transmittance at 580 nm. In another aspect, the compound may further be configured wherein a light transmittance at 450 nm (for example, blue) is greater than the light transmittance at 480 nm. In a further aspect, the compound may further be configured wherein a light transmittance at 600 nm (for example, yellow-orange) is greater than the light transmittance at 580 nm.

In one aspect, the compound may be configured to impart light transmittance characteristics such that the lens exhibits a light transmittance at 550 nm that is at least 10% transmittance less than the transmittance at 480 nm. In another aspect, the compound may be configured to impart light transmittance characteristics such that the lens exhibits a light transmittance at 550 nm that is at least 15% transmittance less than the transmittance at 480 nm. In another aspect, the compound is configured to impart light transmittance characteristics such that the lens exhibits a light transmittance at 550 nm that is at least 20% transmittance less than the transmittance at 480 nm.

In another aspect, the compound may be configured to impart light transmittance characteristics such that the lens exhibits light transmittance at the extremities of the light bandwidth 500 nm to 570 nm that are greater than the light transmittance between 520 nm and 560 nm. In one aspect, the compound may be configured to impart light transmittance characteristics such that the lens exhibits light transmittance at the extremities of the light bandwidth 500 nm to 570 nm that are greater than the light transmittance at 550 nm.

In another aspect, the compound may be configured to impart light transmittance characteristics such that the lens exhibits light transmittance at 550 nm of about 5% to 15%. In another aspect, the compound may be configured to impart light transmittance characteristics such that the lens exhibits light transmittance at 550 nm of about 10%.

In one aspect, the lenses disclosed herein may further comprise a polarizing layer on a surface of the lens.

In another aspect, the lenses disclosed herein may provide enhanced contrast for the wearer for light in the bandwidth of 500 nm to 570 nm, or enhanced contrast for the wearer for light in the bandwidth of 520 nm and 560 nm [green], or enhanced contrast for the wearer for light in at 550 nm. For example, in one aspect, the lenses disclosed herein may provide enhanced contrast for light in the bandwidth of 500 nm to 570 nm for a golfer.

Another embodiment of the invention is an eyewear, for example, sunglasses, having or comprising at least one of the lenses disclosed herein. Another embodiment of the invention is an optical device having or comprising at least one of the lenses disclosed herein.

A further embodiment of the invention is a method for enhancing perception of visual light, the method comprising or including: receiving visual light on a surface of a lens comprising a lens wafer; and a compound overlaying and/or embedded in the lens wafer; wherein the compound is configured to impart light transmittance characteristics such that the lens exhibits a light transmittance at 550 nm [green] that is less than the transmittance at 480 nm and less than the transmittance at 580 nm; allowing the visual light to pass through the lens; and, with the lens, filtering at least some of the visual light passed through the lens to reduce a transmittance of a light bandwith of 500 nm to 570 nm.

In one aspect, the compound may further be configured wherein a light transmittance at 700 nm is greater than the light transmittance at 580 nm, and wherein the method further comprises transmitting 700 nm light with a transmittance of at least of 50%, or with a transmittance of at least 70%.

In one aspect, the compound may further be configured wherein a light transmittance at 450 nm is greater than the light transmittance at 480 nm; and the method may further comprise transmitting 450 nm light with a transmittance of at least of 10%, or with a transmittance of at least of 20%.

In one aspect, the compound may further be configured wherein a light transmittance at 600 nm is greater than the light transmittance at 580 nm; and the method may further comprise transmitting 600 nm light with a transmittance of at least of 50%, or with a transmittance of at least 70%.

Another embodiment of the invention is a lens comprising or including: a lens wafer; and a compound overlaying and/or embedded in the lens wafer; wherein the compound is configured to impart light transmittance characteristics such that the lens exhibits a light transmittance at 550 nm that is greater than 30%, and greater than the transmittance at 480 nm and greater than the transmittance at 580 nm. In one aspect, the lens exhibits a light transmittance at 550 nm that is greater than 50%, or greater than 70%. In one aspect, the compound may comprise one or more dyes, and the one or more dyes may comprise a first dye adapted to limit light transmittance between 460 nm and 520 nm, for example, at or about 490 nm, and a second dye adapted to limit light transmittance between 565 nm to 625 nm, for example, at or about 595 nm. In one aspect, the first dye may comprise 0.01 to 1 grams of dye per kilogram of the lens wafer and the second dye may comprise 0.01 to 1 gram of dye per kilogram of the lens wafer, for example, a polymer. In another aspect, the first dye may comprise 0.05 to 0.5 grams of dye per kilogram the lens wafer and the second dye comprise 0.05 to 0.5 grams of dye per kilogram of the lens wafer.

In one aspect, the compound is further configured wherein a light transmittance at 700 nm is greater than the light transmittance at 580 nm. In another aspect, the compound is further configured wherein a light transmittance at 450 nm is greater than the light transmittance at 480 nm. In one aspect, the compound is further configured wherein a light transmittance at 600 nm is greater than the light transmittance at 580 nm. In another aspect, the lens comprises a luminous transmittance of about 30%, or a luminous transmittance of about 60%.

Another embodiment of the invention is a method for enhancing perception of visual light, the method comprising or including: receiving visual light on a surface of a lens comprising a lens wafer; and a compound overlaying and/or embedded in the lens wafer; wherein the compound is configured to impart light transmittance characteristics such that the lens exhibits a light transmittance at 550 nm that is greater than 30%, and greater than the transmittance at 480 nm and greater than the transmittance at 580 nm; allowing the visual light to pass through the lens; and with the lens, filtering at least some of the visual light passed through the lens to reduce a transmittance of a light bandwidth of 500 nm to 570 nm. In one aspect of the method, the lens exhibits a light transmittance at 550 nm that is greater than 50%, or greater than 70%.

These and other aspects, features, and advantages of these invention will become apparent from the following detailed description of the various aspects of the invention taken in conjunction with the accompanying drawings.

BRIEF DESCRIPTION OF THE DRAWINGS

The subject matter, which is regarded as the invention, is particularly pointed out and distinctly recited in the claims at the conclusion of the specification. The foregoing and other objects, features, and advantages of the invention will be readily understood from the following detailed description of aspects of the invention taken in conjunction with the accompanying drawings in which:

FIG. 1 is a schematic front elevation view of half of an eyewear having a lens according to one aspect of the invention.

FIG. 2 is a cross-sectional view of the lens shown in FIG. 1.

FIG. 3 is an exploded perspective view of the lens shown in FIG. 1.

DETAILED DESCRIPTION OF THE INVENTION

Figure 4:
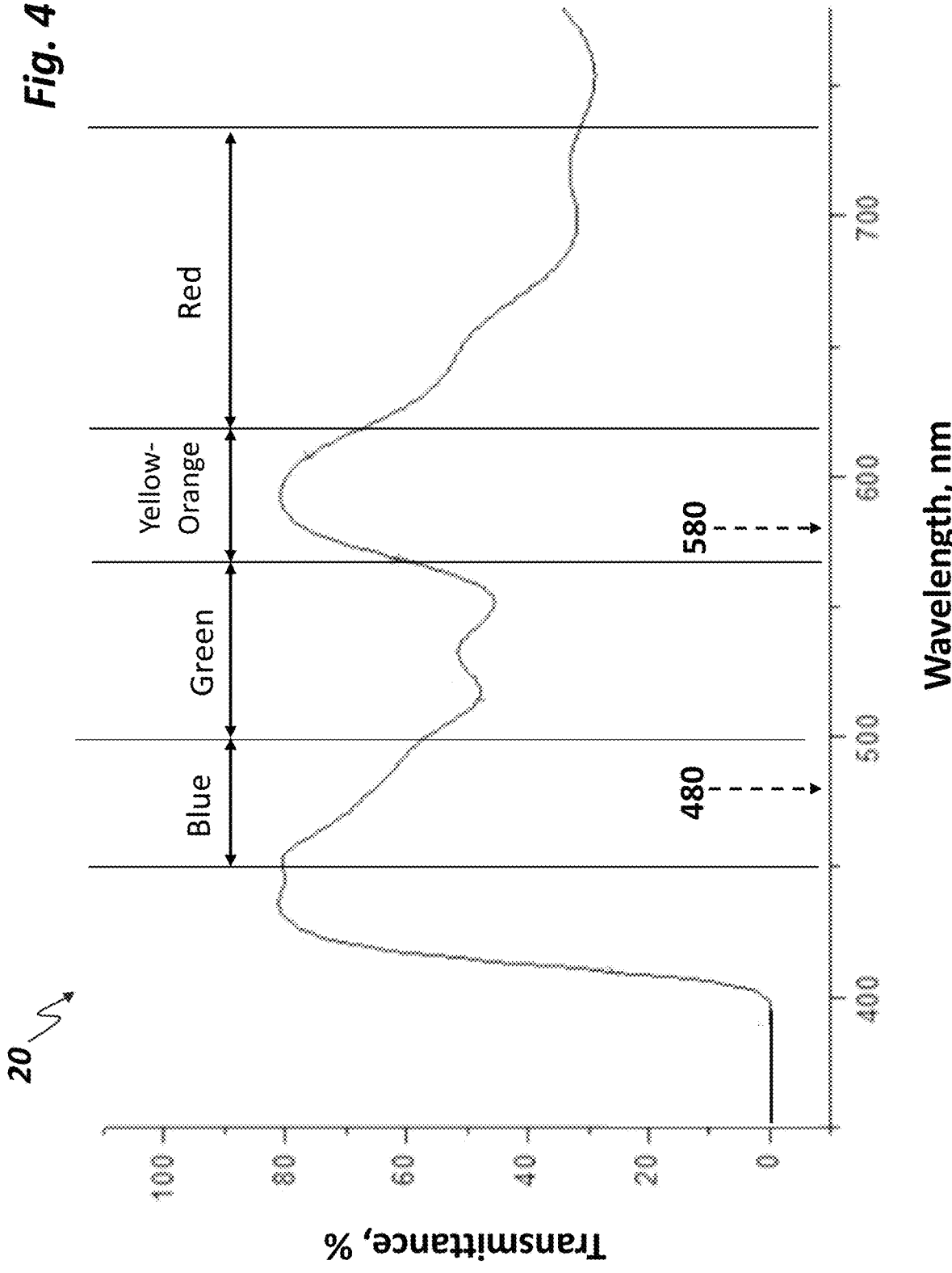
FIG. 4 is a graph of the transmittance as a function of wavelength of a lens according to one aspect of the invention.

FIG. 1 is a schematic front elevation view of half of an eyewear 10 having a lens 12 according to one aspect of the invention. According to aspects of the intervention, eyewear 10 may be any conventional eyewear, for example, sunglasses; eyeglasses, including prescription, corrective eyeglasses, protective eyeglasses; visors, including sports visors; goggles, including protective goggles; and contacts, for example tinted contacts, among others. Eyewear 10 may have a frame 11 holding the lens 12, though in other aspects, no frame 11 may be required. However, in other aspects of the invention, lens 12 as disclosed herein may be any optical device that can benefit from features of the lens disclosed herein, for example, binoculars, a spotting scope, a periscope, a telescope, a computer screen, or a camera lens, among others.

FIG. 2 is a cross-sectional view of the lens 12 shown in FIG. 1. As shown in FIG. 2, lens 12 includes a lens wafer 14; and a compound 16 overlaying the lens wafer 14. FIG. 3 is an exploded perspective view of the lens 12 shown in FIG. 1. For the sake of facilitating disclosure of aspects of the invention, in FIGS. 2 and 3, the compound 16 is shown schematically as overlaying or mounting to the lens wafer 14; however, in one aspect of the invention, compound 16 may not overlay lens wafer 14 but may be embedded in or comprise the content of lens wafer 14.

As known in the art, lens wafer 14 may comprise any structurally sufficient, optical light-transferring material or medium capable of being supported in a position desired, for example, before the eye of the wearer or before the optical sensing device of an optical device. In one aspect, as known in the art, an optical lens wafer may be to a thin, flat piece of material, typically glass or plastic, that serves as a substrate for manufacturing optical lenses. Lens wafers may be produced with precise surface properties and uniform thickness to enable the formation of lenses through processes like grinding, polishing, and coating. As known in the art, features of an optical lens wafer may include: 1) Uniform thickness: Essential for ensuring consistent optical performance; 2) Surface quality: Free from defects, scratches, or irregularities that could distort light transmission; and 3) Material properties: Lens wafers are often made from optical glass or advanced polymers with specific refractive indexes suitable for lens applications. These and further features of lens wafers according to aspects of the invention are provided by SPIE (International Society for Optics and Photonics) which provides resources on optical materials and wafer manufacturing; ISO 10110 standards which outline specifications for the optics manufacturing process, including surface quality and material properties for lenses; and SEMI Standards related to semiconductor and wafer production also offer insights into the production and quality control of wafers used in optics. These three references are included by reference herein in their entirety.

According to aspects of the intention lens wafer 14 may be tinted, for example, having color, such as, rose, copper, or brown, among other tints.

According to aspects of the invention, the compound 16 overlaying or within lens wafer 14 is configured to impart a preferred light transmittance characteristic to the lens 12, for example, reducing the transmittance of green light (500-570 nm) while allowing or enhancing the transmittance of other light bands, such as, red, blue, and/or yellow-orange, as disclosed herein. In one aspect, the compound 16 exhibits a light transmittance through lens 12 at 550 nm (green) that is less than the transmittance though lens 12 at 480 nm and less than the transmittance at 580 nm. In other aspects, the compound 16 overlaying or within lens wafer 14 is configured to impart a preferred light transmittance characteristic to the lens 12, for example, enhancing the transmittance of green light (500-570 nm) while allowing or enhancing the transmittance of other light bands, such as, red, blue, and/or yellow-orange, as disclosed herein. For example, in one aspect, the compound 16 overlaying or within lens wafer 14 may comprise one or more dyes, or two or more dyes, as disclosed herein, wherein the one or more dyes are chosen to provide the desired transmittance. As disclosed below in the discussion of FIGS. 11 and 12, the one or more dyes used of compound 16 may be selected from commercially-available dyes having the desired absorption spectra.

FIG. 4 is a graph 20 of the transmittance as a function of wavelength of a lens according to one aspect of the invention. For example, graph 20 may be provided pursuant to ANSI Z80.3-2018, which is included by reference herein. As known in the art, and described above and pursuant to ANSI Z80.3-2018, "transmittance" is an optical property of a medium, for example, a lens, and represents the ratio, typically, in percent, of the power of the radiation transmitted through medium, in this case, visual light, to the power of the incident radiation. As shown in FIG. 4, the transmittance of one aspect of the invention varies over the wavelengths of visual light.

In order to illustrate the benefits of aspects of the invention shown in FIG. 4, the bands of wavelength typically associated with different colors of visual light are also shown in FIG. 4. Specifically, the typical recognized bands of wavelength for blue light (450-500 nm), green light (500-570 nm), yellow-orange light (570-620 nm), and red light (620-740 nm) are shown in FIG. 4. The wavelengths, 480 nm and 580, which are characterized as having poor chromatic response are also shown for reference in FIG. 4.

As shown in FIG. 4, according to this aspect, the transmittance of blue light (450-500 nm) and yellow-orange light (570-620 nm) may be relatively higher than the transmittance of green light (500-570 nm), while the transmittance red light (620-740 nm) may decrease across its bandwidth. As shown in FIG. 4, in one aspect, the transmittance of green light (500-570 nm) is decreased, that is, filtered more, where the transmittance of other non-green light, such as, blue light and yellow-orange light increases, that is, is less filtered. According to one aspect of the invention, the reduced transmittance, or increased filtering, of the green light and the reduced filtering of the non-green light may provide enhanced color recognition and enhanced contrast of the green light, for example, of the green light observed on a putting green.

According to aspects of the invention, the content of the compound that yields the transmittance characteristics shown in FIG. 4 may comprise at least one dye or a plurality of dyes. As disclosed below in the discussion of FIGS. 11 and 12, the one or more dyes that can be used to provide the transmittance shown in FIG. 4, for example, limiting the transmittance of green light, may be selected from commercially-available dyes having the desired absorption spectra.

Figure 5:
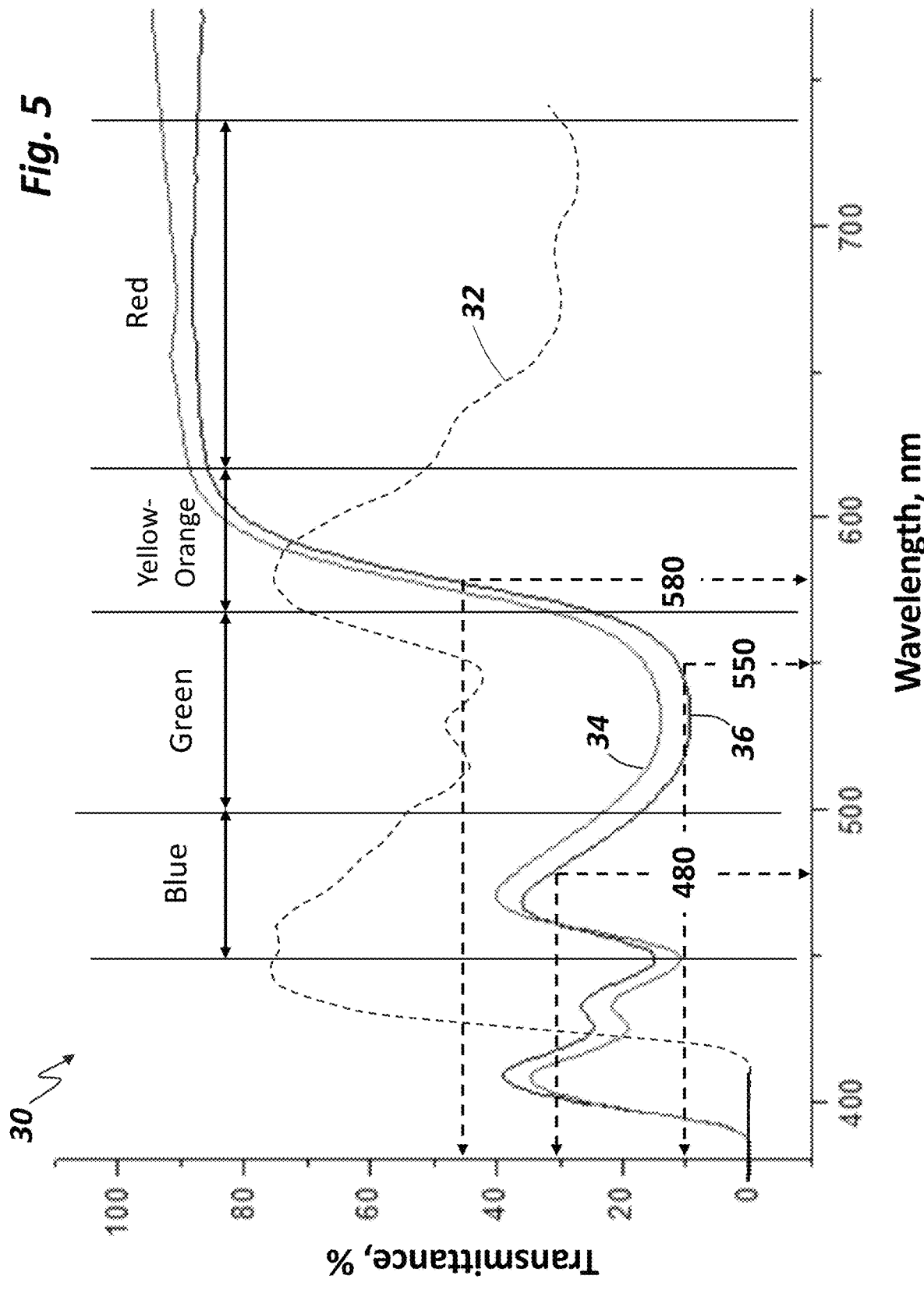
FIG. 5 is a graph of the transmittance as a function of wavelength of aspects of the invention compared to the transmittance shown in FIG. 4.

FIG. 5 is a graph 30 of the transmittance as a function of wavelength of aspects of the invention compared to the transmittance shown in FIG. 4 according to one aspect. For example, graph 30 may be provided pursuant to ANSI Z80.3-2018, which is included by reference herein. The transmittance curve of the aspect of the invention shown in FIG. 4 is shown in dashed line 32 for reference in FIG. 5. Two transmittance curves 34 and 36 of lenses according to aspects of the invention are shown in FIG. 5. The bandwidths of blue light (450-500 nm), green light (500-570 nm), yellow-orange light (570-620 nm), and red light (620-740 nm) and the wavelengths 480 nm and 580 that are characterized as having poor chromatic response are also shown for reference in FIG. 5.

As shown in FIG. 5, according to one aspect of the invention, the lenses according to aspects of the invention, such as, lens 12, exhibit a light transmittance 34, 36 in the green light bandwidth (500-570 nm) that is not only less than the transmittance 32 of the lens according to an aspect of the invention shown in FIG. 4, but the transmittance 34, 36 of the lenses according to aspects of the invention decreases in the green light bandwidth (500-570 nm) from relatively higher transmittance at the extremities of the green light bandwidth (500-570 nm) to a minimum at a bandwith between about 520 nm and 560 nm. Specifically, in one aspect, the transmittance 34, 36 of aspects of the invention is lower between the extremities of the green light bandwidth (500-570 nm) to a minimum transmittance about midway between the extremities of the green light bandwidth (500-570 nm). In one aspect, the transmittance 34, 36 of the lenses according to an aspect of the invention in the green light bandwidth (500-570 nm), for example, between 520 nm and 560 nm, is less than the transmittance at 480 nm and less than the transmittance at 580 nm, that is, at the wavelengths characterized as having poor chromatic response.

Close examination of the curves shown in FIG. 5 reveals that the transmittance of a lens according to aspects of the invention at between 520 nm and 560 nm, for example, at 550 nm, is about 5% to 15%, for example, about 10% where the transmittance at 480 nm is about 30% and the transmittance at 580 nm is about 45%. That is, according to one aspect of the invention, the transmittance of lens between 520 nm and 560 nm may be at least 5% transmittance less than the transmittance at 480 nm and/or the transmittance at 580 nm. In one aspect, the transmittance between 520 nm and 560 nm may be at least 10% transmittance or 15% transmittance less than the transmittance at 480 nm and/or the transmittance at 580 nm. In one aspect, the transmittance between 520 nm and 560 nm may be at least 20% transmittance less than the transmittance at 480 nm and/or the transmittance at 580 nm. It will be recognized by those of skill in the art that the above differences in transmittance percentages are differences in transmittance, or in transmittance percentage points. In other words, the percent differences stated are not in terms of percentages of the transmittances, but in differences in transmittance expressed as percentages.

FIG. 5 also illustrates that, according to one aspect of the invention, the transmittance of yellow-orange light (570-620 nm) may be greater than the transmittance of yellow-orange light according to the aspect shown in FIG. 4, as indicated by dashed line curve 32. For example, as shown in FIG. 5, the transmittance of yellow-orange light in curves 34 and 36 in the bandwith of about 595 nm to 620 nm is about 75% to 90% where the transmittance at 595 nm to 620 nm is about 50% to 72% for the lens according to the aspect shown in FIG. 4, as indicated by dashed line curve 32.

FIG. 5 further illustrates that, according to one aspect of the invention, the transmittance of red light (620-740 nm) may be greater than the transmittance of red light according to the aspect shown in FIG. 4, as indicated by dash line curve 32. For example, as shown in FIG. 5, the transmittance of red light in curves 34 and 36 in the bandwith of about 620 nm to 740 nm is about 88% to 92%, where the transmittance at 620 nm to 700 nm in the aspect shown in FIG. 4, as indicated by curve 32, is about a maximum of about 50% and decreases with increased wavelength. In contrast, the transmittance at 480 nm in curves 34 and 36 is about 30% and the transmittance at 580 nm in curves 34 and 36 is about 45%. That is, according to one aspect of the invention, the transmittance of a lens according to an aspect of the invention in curves 34 and 36 between 620 nm and 740 nm may be at least 5% transmittance greater than the transmittance at 480 nm and the transmittance at 580 nm in curves 34 and 36. In one aspect, the transmittance in curves 34 and 36 between 620 nm and 740 nm may be at least 10% transmittance greater than the transmittance at 480 nm and the transmittance at 580 nm in curves 34 and 36. In one aspect, the transmittance in curves 34 and 36 between 620 nm and 700 nm may be at least 15% transmittance greater, or at least 20% transmittance greater, or at least 30% transmittance greater, or at least 40% transmittance greater than the transmittance at 480 nm and the transmittance at 580 nm in curves 34 and 36.

According to aspects of the invention, the content of the compound that yields the transmittance characteristics shown in FIG. 5 may comprise at least one dye or a plurality of dyes. As disclosed below in the discussion of FIGS. 11 and 12, the one or more dyes that can be used to provide the transmittance shown in FIG. 5, for example, limiting the transmittance of green light, may be selected from commercially-available dyes having the desired absorption spectra.

Figure 7:
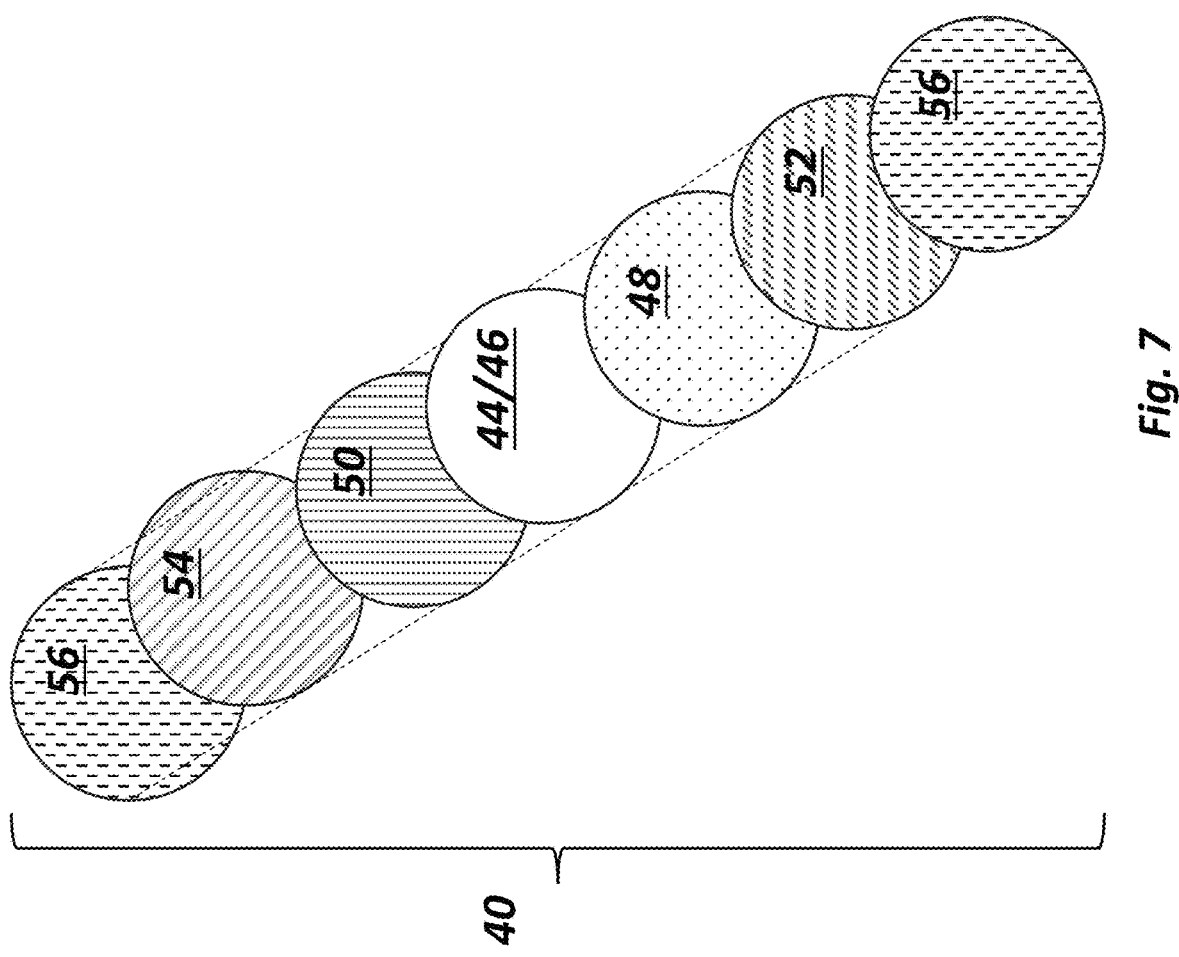
FIG. 7 is an exploded perspective view of the lens shown in FIG. 6.
Figure 6:
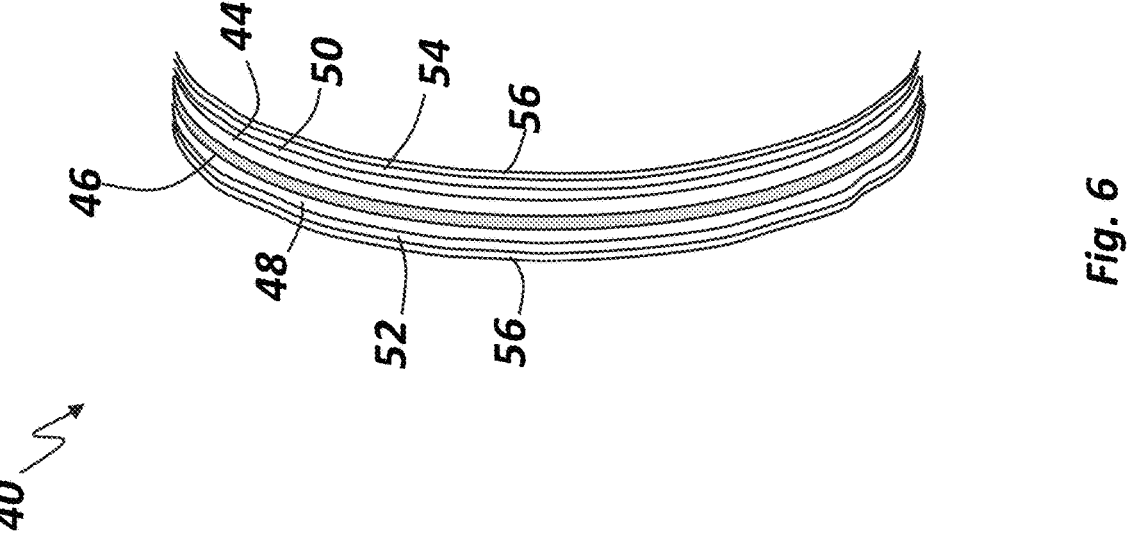
FIG. 6 is a cross-sectional view of a lens according another aspect of the invention.

FIG. 6 is a schematic cross-sectional view of a lens 40 according another aspect of the invention. FIG. 7 is an exploded perspective view of the lens 40 shown in FIG. 7. According to this aspect, lens 40 includes a lens wafer 44; and a compound 46 overlaying the lens wafer 44 and/or embedded within lens wafer 44. As noted earlier, for the sake of facilitating disclosure of aspects of the invention, in FIGS. 6 and 7, the compound 46 is shown schematically as overlaying or mounting to the lens wafer 44, but the compound 46 may not overlay lens wafer 44 but may be embedded in or comprise the content of lens wafer 44. According to aspects of the invention, the compound 46 overlaying or within lens wafer 44 is configured to impart a preferred light transmittance characteristic as disclosed herein, for example, reducing or enhancing the transmittance of green light (500-570 nm) while reducing or enhancing the transmittance of other light bands, such as, the red, the blue, and/or the yellow-orange light transmittance, as disclosed herein and as shown in FIG. 5, and in FIGS. 8 through 15.

In one aspect of the invention, in addition to a lens wafer 44 and the compound 46 (or lens wafer 14 and compound 16), lens 40 (and lens 12) may include one or more of the following: a tinting layer 48, a polarizing layer 50, a mirrored layer 52, an anti-reflection layer 54, and one or more scratch-resistance layers 56. The lens wafer 44 may be made from any light transferring material, for example, a glass, a plastic, or a polymer, such as, a polycarbonate (PC), a polyamide (for example, Nylon polyamide), a polymethyl methacrylate (PMMA), a cyclic olefin copolymer (COC), or a bio-based thermoplastic, among other polymers. In one aspect, any one of these plastics or polymers may be an "optical grade" plastic or polymer or an "optical grade thermoplastic." The lens wafter 44 may be opaque, transparent, or translucent, and may include dyes providing at least some tinting to lens wafer 44.

The layers in FIGS. 6 and 7 are shown in one non-limiting order and positioning; however, according to aspects of the invention, the order and positioning of the layers shown n FIGS. 6 and 7 may vary without detracting from aspects of the invention and their performance as disclosed herein.

The tinting layer 48 may provide at least some tinting to lens 44, for example, in addition to or in place of the tinting provided for lens wafer 44. The polarizing layer 50 may comprise a polarizing film that reduces at least some glare, for example, a polarizing film provided by Mitsubishi, or its equivalent. The mirrored layer 52 may provide at least some reflectance and/or at least some reduction in light transmittance. For example, mirrored layer 52 may be a vacuum deposited layer, as known in the art. The anti-reflection layer 54 may provide at least some reduction of reflection from the surface of lens 40, for example, reduction of undesirable reflection into the eyes of the wearer. For example, the anti-reflection layer 54 may be a vacuum deposited layer, as known in the art. The one or more scratch-resistance layers 56 may, as the name implies, provide at least some scratch resistance to lens 40. The one or more scratch-resistance layers 56 may comprise a film of hard material, for example, a flow-coated or a dip-coated film, as known in the art. In one aspect, one or more of the layers of lens 12 or lens 40 may also provide UV filtering, for example, UV filtering for incident light having wavelengths up to 400 nm.

Figure 8:
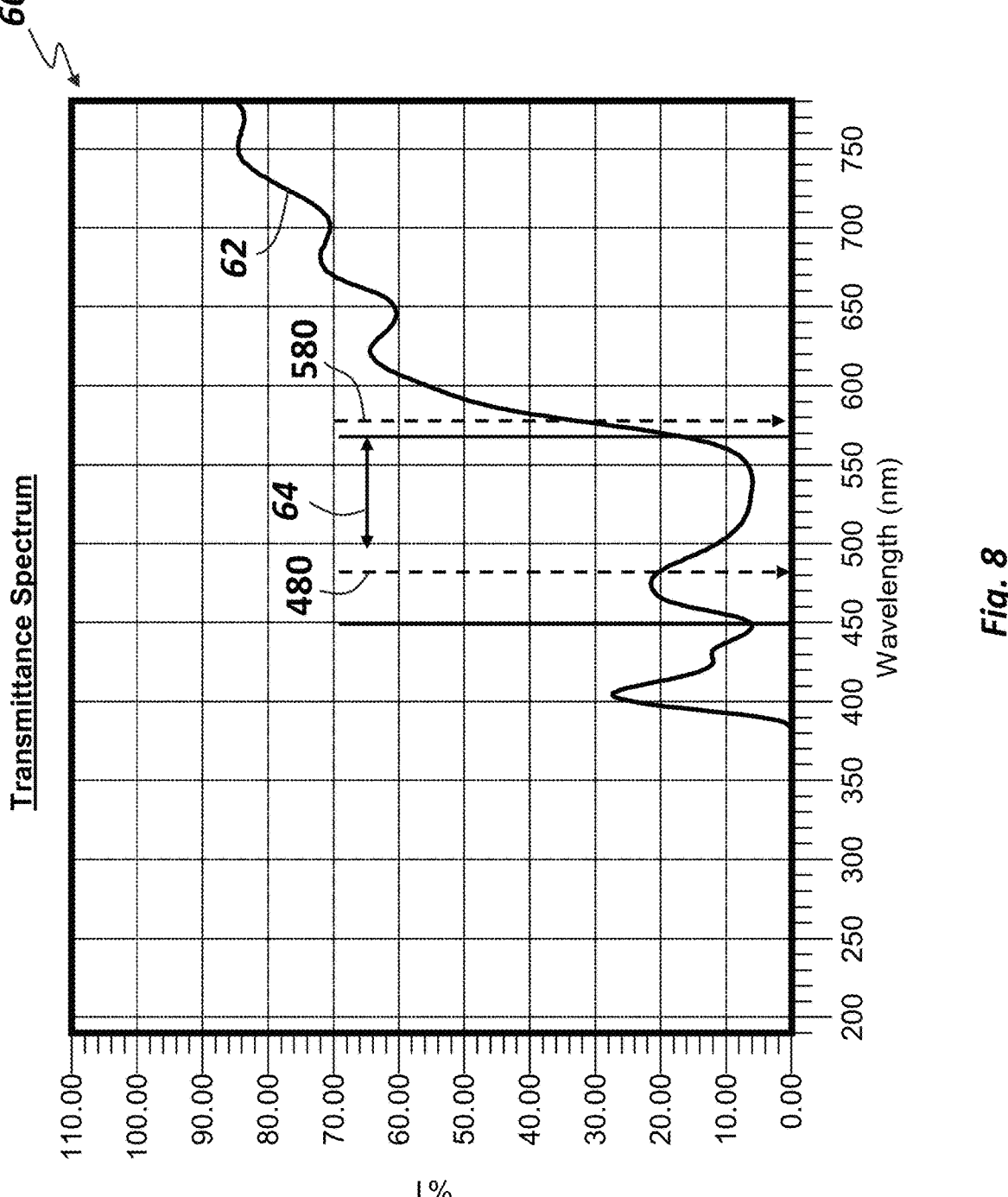
FIG. 8 is a graph of the transmittance as a function of wavelength of an aspect of the invention.

FIG. 8 is a graph 60 of the transmittance as a function of wavelength of aspects of the invention as provided by a prototype lens according to an aspect of the invention. For example, graph 60 may be provided pursuant to ANSI Z80.3-2018, which is included by reference herein. The transmittance curve 62 in graph 60 represents the transmittance of a lens according to aspects of the invention are shown in FIG. 8. The transmittance of the bandwidths of green light (500-570 nm) 64 and the wavelengths 480 nm and 580 that are characterized as having poor chromatic response are also shown for reference in FIG. 8.

As shown in FIG. 8, according to one aspect of the invention, the lens according to aspects of the invention, such as, lens 12 or lens 40, exhibit a light transmittance 62 in the green light bandwidth (500-570 nm) 64 that is less transmittance at the extremities of the green light bandwidth (500-570 nm) 64 to a minimum at a bandwidth between about 520 nm and 560 nm. Specifically, in one aspect, the transmittance 62 of aspects of the invention is lower between the extremities of the green light bandwidth (570-570 nm) 64 to a minimum transmittance about midway between the extremities of the green light bandwidth (570-570 nm). In one aspect, the transmittance 62 of the lenses between the extremities of the green light bandwidth (570-570 nm) 64 according to an aspect of the invention is also less than the transmittance at 480 nm and less than the transmittance at 580 nm, that is, at the wavelengths characterized as having poor chromatic response.

Close examination of the curve 62 shown in FIG. 8 reveals that the transmittance of a lens according to aspects of the invention at between 520 nm and 560 nm, for example, at 550 nm, is about 5% to 15%, for example, about 8% where the transmittance at 480 nm is about 12% and the transmittance at 580 nm is about 30%. That is, according to one aspect of the invention, the transmittance of lens between 520 nm and 560 nm may be at least 5% transmittance less than the transmittance at 480 nm and/or the transmittance at 580 nm. In one aspect, the transmittance between 520 nm and 560 nm may be at least 10% transmittance or 15% transmittance less than the transmittance at 480 nm and/or the transmittance at 580 nm. It will be recognized by those of skill in the art that the above differences in transmittance percentages are differences in transmittance, or in transmittance percentage points. In other words, the percent differences stated are not in terms of percentages of the transmittances, but in differences in transmittance expressed as percentages.

FIG. 8 also illustrates that, according to one aspect of the invention, the transmittance of yellow-orange light (570-620 nm) may be, as indicated by curve 62, about at least 40%. FIG. 8 further illustrates that, according to one aspect of the invention, the transmittance of red light (620-740 nm) may greater than 60%.

According to aspects of the invention, the content of the compound that yields the transmittance characteristics shown in FIG. 8 may comprise at least one dye or a plurality of dyes. As disclosed below in the discussion of FIGS. 11 and 12, the one or more dyes that can be used to provide the transmittance shown in FIG. 8, for example, limiting the transmittance of the green light bandwidth (570-570 nm) 64, may be selected from commercially-available dyes having the desired absorption spectra.

Figures 9, 10:
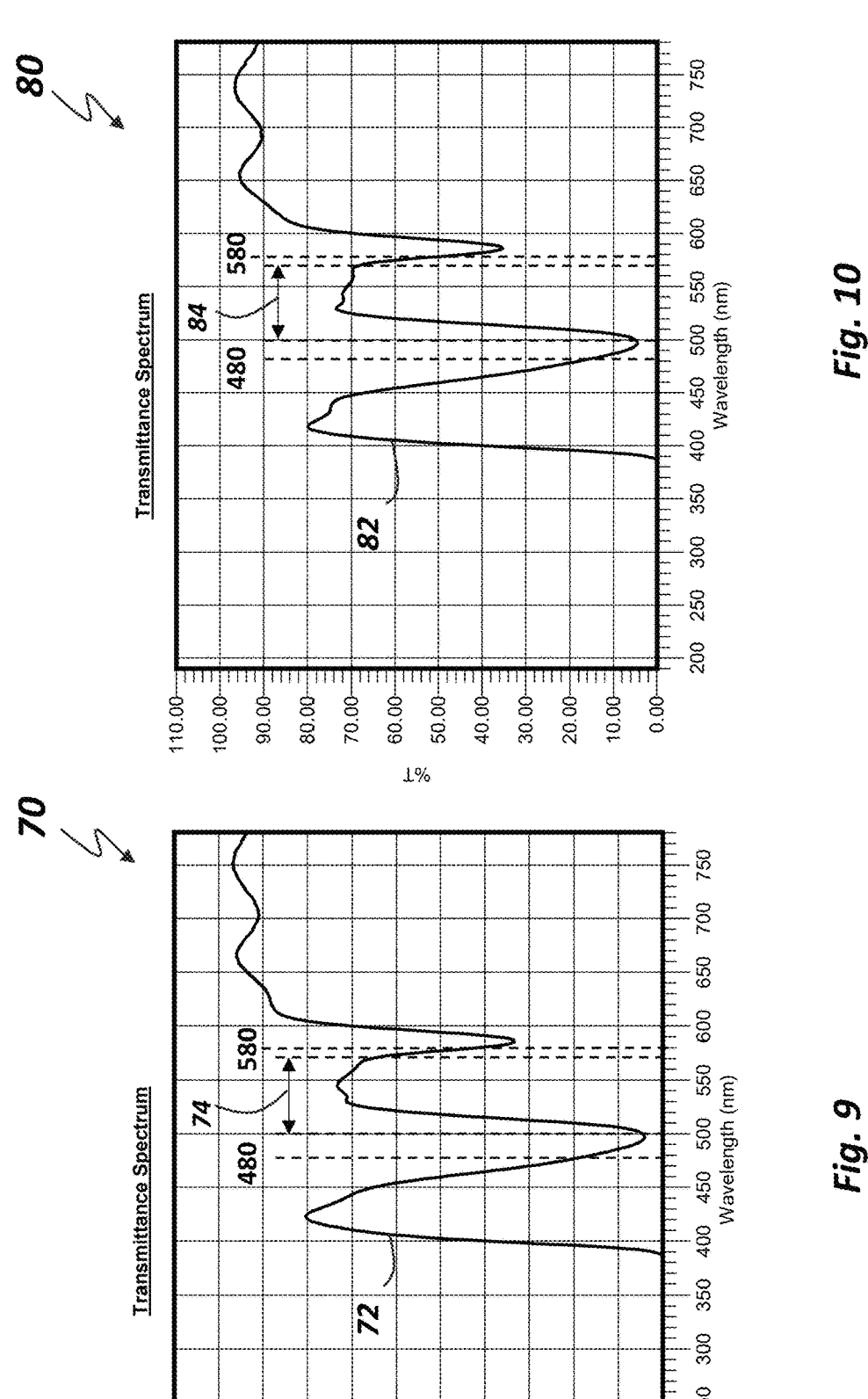
FIGS. 9 and 10 are graphs of the transmittance as a function of wavelength according to other aspects of the invention.

FIGS. 9 and 10 are graphs 70 and 80 of the transmittances as a function of wavelength according to another aspect of the invention. For example, graphs 70 and 80 may be provided pursuant to ANSI Z80.3-2018, which is included by reference herein. The transmittance curve 72 of a lens according to aspects of the invention is shown in FIG. 9 and the transmittance curve 82 of a lens according to aspects of the invention is shown in FIG. 9. The curves 72 and 82 represent the performance of lenses having a luminous transmittance, as known in the art, of about 60%. The transmittance of the bandwidths of green light (500-570 nm) 74 and 84, respectively, and the wavelengths 480 nm and 580 that are characterized as having poor chromatic response are also shown for reference in FIGS. 9 and 10.

According to the aspect of the invention shown in FIGS. 9 and 10, the lenses comprise a lens wafer and a compound that reduces the transmittance at the extremities of the bandwidths of green light (500-570 nm) 74, 84. For example, the compound reduces the transmittance at the extremities of the bandwidths of green light (500-570 nm) 74, 84 while providing less filtering between the extremities of the bandwidths of green light (500-570 nm) 74, 84. For example, in one aspect of the invention, lenses are provided that provide "gap filtering" in the bandwidths of green light (500-570 nm) 74, 84, for example, gap filtering at the extremities of the bandwidths of green light (500-570 nm)

74, 84. In one aspect, the compound according to aspects of the invention is configured to impart light transmittance characteristics such that the lens exhibits a light transmittance at 550 nm that is greater than 30%, and greater than the transmittance at 480 nm and greater than the transmittance at 580 nm. In another aspect, as shown in FIGS. 9 and 10, the lens may exhibit a light transmittance at 550 nm that is greater than 50%, or greater than 70%.

According to aspects of the invention, the content of the compound that yields the transmittance characteristics shown in FIGS. 9 and 10 may comprise at least one dye or a plurality of dyes. As disclosed below in the discussion of FIGS. 11 and 12, the one or more dyes that can be used to provide the transmittance shown in FIGS. 9 and 10, for example, enhancing the transmittance of the green light bandwidth (570-570 nm) 74, 84, may be selected from commercially-available dyes having the desired absorption spectra.

Figures 11, 12:
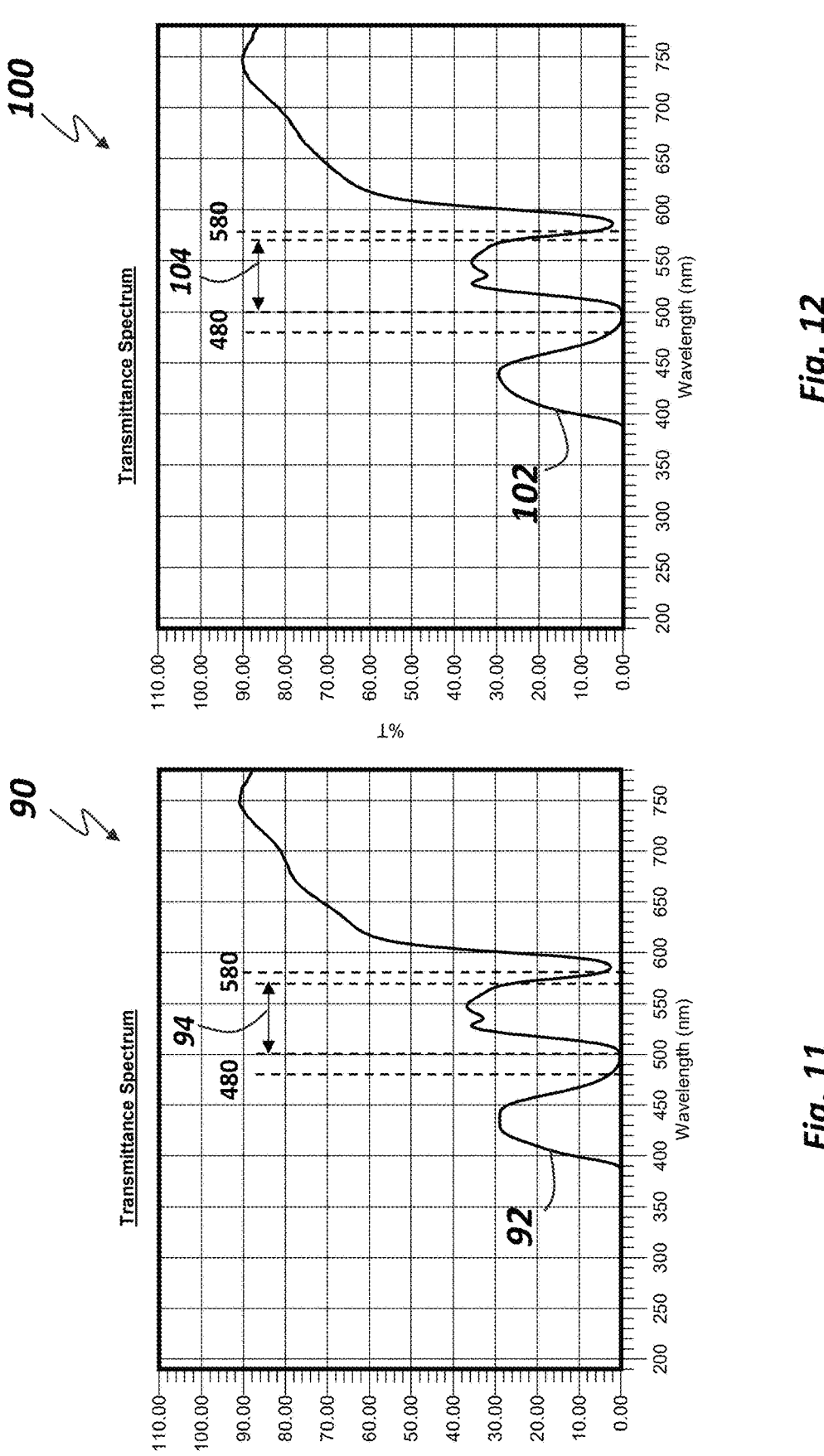
FIGS. 11 and 12 are graphs of the transmittance as a function of wavelength according to further aspects of the invention.

FIGS. 11 and 12 are graphs 90 and 100 of the transmittances as a function of wavelength according to another aspect of the invention. For example, graphs 90 and 10 may be provided pursuant to ANSI Z80.3-2018, which is included by reference herein. The transmittance curve 92 in graph 90 of a lens according to aspects of the invention is shown in FIG. 11 and the transmittance curve 102 in graph 100 of a lens according to aspects of the invention is shown in FIG. 12. The curves 92 and 102 represent the performance of lenses having a luminous transmittance, as known in the art, of about 30%, specifically about 28%. The transmittance of the bandwidths of green light (500-570 nm) 94, 104, respectively, and the wavelengths 480 nm and 580 that are characterized as having poor chromatic response are also shown for reference in FIGS. 11 and 12.

According to the aspect of the invention shown in FIGS. 11 and 12, in a fashion similar to the curves 72 and 82 shown in FIGS. 9 and 10, the lenses comprise a lens wafer and a compound, for example, a compound having one or more dyes, that enhances the transmission of light within the bandwidth of green light (500-570 nm) 94, 104, and may reduce the transmittance at the extremities of the bandwidths of green light (500-570 nm) 94, 104. For example, the compound reduces the transmittance at the extremities of the bandwidths of green light (500-570 nm) 94, 104 while providing less filtering, or relatively increased transmittance, between the extremities of the bandwidths of green light (500-570 nm) 94, 104. For example, in one aspect of the invention, lenses are provided that provide "gap filtering" in the bandwidths of green light (500-570 nm) 94, 104, for example, gap filtering at the extremities of the bandwidths of green light (500-570 nm) 94, 104. In one aspect, the compound according to aspects of the invention is configured to impart light transmittance characteristics such that the lens exhibits a light transmittance at 550 nm that is greater than 20%, and greater than the transmittance at 480 nm and greater than the transmittance at 580 nm. In another aspect, as shown in FIGS. 11 and 12, the lenses may exhibit a light transmittance at 550 nm that is greater than 30%, or greater than 40%. According to aspects of the invention, the transmittance of light at or around 550 nm, that is, green light, may be enhanced and thus enhance the visual contrast experienced by the wearer of the lenses, for example, a golfer putting on the green grass of a golf green.

According to an aspect of the invention, the transmittance curves 92 and 102 shown in FIGS. 11 and 12 may be provided by one or more dyes in an overlay on a lens wafer and/or within the lens wafer. In one aspect, the one or more dyes may comprise at least a first dye and a second dye, different from the first dye. In one aspect, the first dye may be adapted to limit light transmittance between 460 nm and 520 nm (that is, 490 nm plus or minus 30 nm) and the second dye may be adapted to limit light transmittance between 565 nm to 625 nm (that is, 595 nm plus or minus 30 nm). In another aspect, the first dye may limit light transmittance between 470 nm and 510 nm and the second dye may limit light transmittance between 575 nm and 615 nm. In a still further aspect of the invention, the first dye may limit light transmittance between 480 nm and 500 nm and the second dye may limit light transmittance between 585 nm and 605 nm. In a still further aspect, the first dye may limit light transmittance between 485 nm and 495 nm, for example, near or about 490 nm, and the second dye may limit light transmittance between 590 nm and 600 nm, for example, near or about 595 nm.

As known in the art, a specific dye that may be used to limit the transmittance of or filter visible light at specific wavelength for any dye disclosed herein can be determined by any conventional dye identification method. However, in one aspect, a dye for limiting transmission for a desired or a given wavelength may be identified by identifying a dye having an absorption spectrum that approximates or matches the wavelength of the light that is to be filtered. Dye manufactures typically identity their dyes by the peak or maximum wavelength of the absorption spectrum of the dye. Hence, as known in the art, in order to identity the manufacture's dye desired, the investigator need only select a dye having an absorption spectrum maximum, or peak, at or near the wavelength to be filtered or limited.

For example, in the transmittance curves 92, 102 shown in FIGS. 11 and 12, one of the wavelengths of the light to be filtered is at around 490 nm, as indicated by the troughs in curves of FIGS. 11 and 12. Accordingly, knowing this target wavelength, one of skill in the art can identify an appropriate dye having the desired filtering from dyes having an absorption peak at or near 490 nm. For example, such a dye is provided by QCR Solutions Corporation of Port Saint Lucie, Florida, for example, a dye marketed under the dye number VIS494B having a peak absorption at 494 nm, and such a dye is also provided by Crysta-Lyn Chemical Company of Endicott, New York, for example, a dye marketed under the dye number DLS488A having a peak absorption at 488 nm. Either of these commercially-available dyes, among other commercially-available dyes, may be used as the first dye in aspects of the invention to limit the transmittance of light at or near 490 nm—as shown in FIGS. 11 and 12.

Similarly, in the transmittance curves 92, 102 shown in FIGS. 11 and 12, one of the wavelengths of the light to be filtered is at around 595 nm, as indicated by the troughs in curves of FIGS. 11 and 12. One of skill in the art can identify an appropriate second dye having an absorption peak at or near 595 nm, for example, dye number VIS593A provided by QCR Solutions Corporation having a peak absorption at 593 nm, and dye number DLS598A provided by Crysta-Lyn Chemical Company having a peak absorption at 599 nm, among other commercially-available dyes. Similarly, any other dyes having the target wavelengths for limiting transmittance or filtering disclosed herein may also be identified and obtained from these and other dye manufactures.

According to aspects of the invention, the amount of dye used for the compound in an overlayer or within the lens wafer to provide the transmittance shown in FIGS. 11 and 12, or for any dye disclosed herein, may vary. For example, in one aspect, the first dye and the second dye for any compound disclosed herein may be provided in a range of from 0.01 grams per kilogram [g/kg] of overlay or lens wafer, for example, per kg of polycarbonate, to 1 g/kg of overlay or lens wafer. In another aspect, the first dye and the second dye may be provided in a range from 0.05 g/kg of overlay or lens wafer to 0.5 g/kg of overlay or lens wafer.

Figure 13:
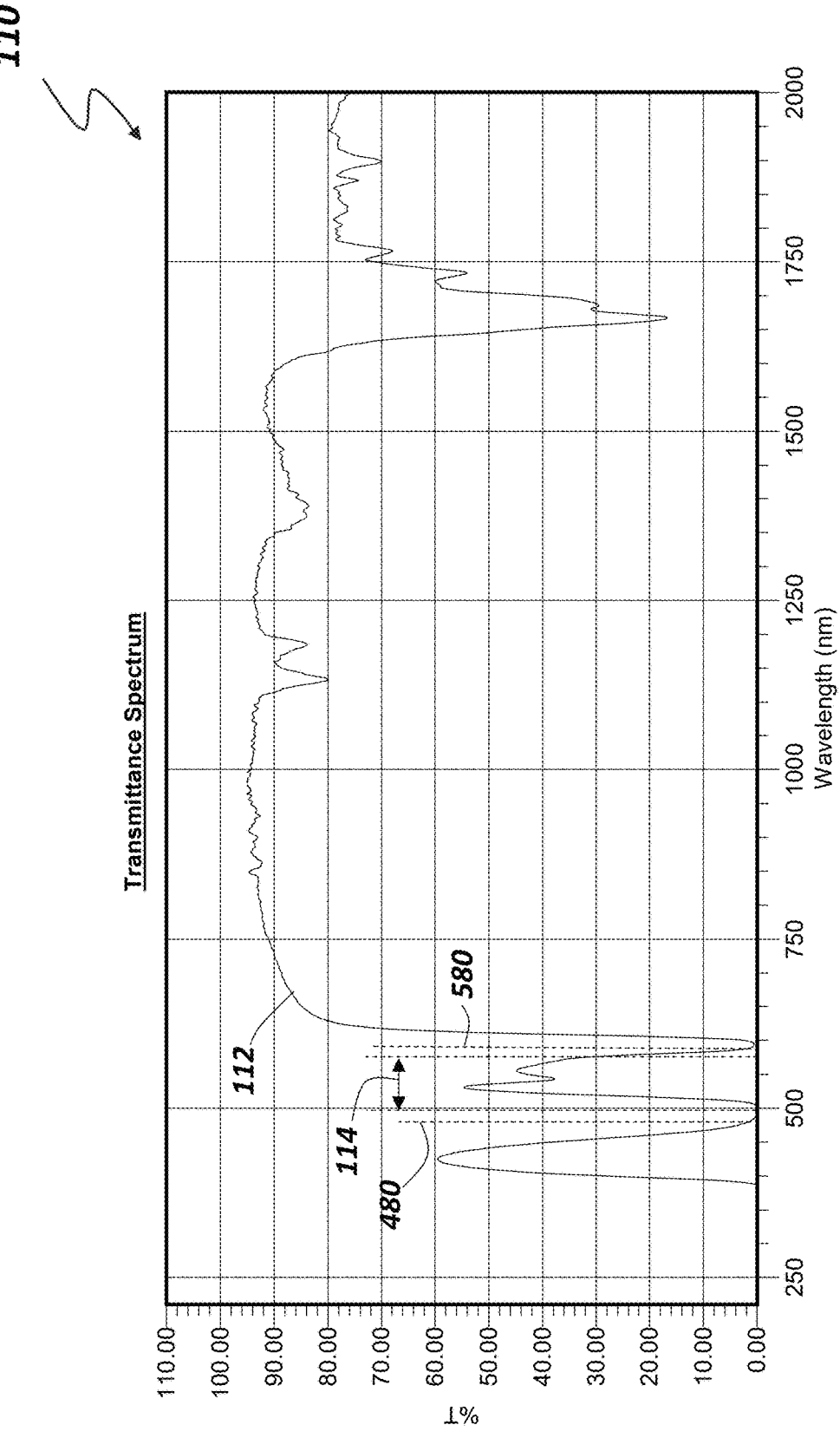
FIGS. 13 and 14 are graphs of the transmittance as a function of wavelength according to further aspects of the invention.
Figure 14:
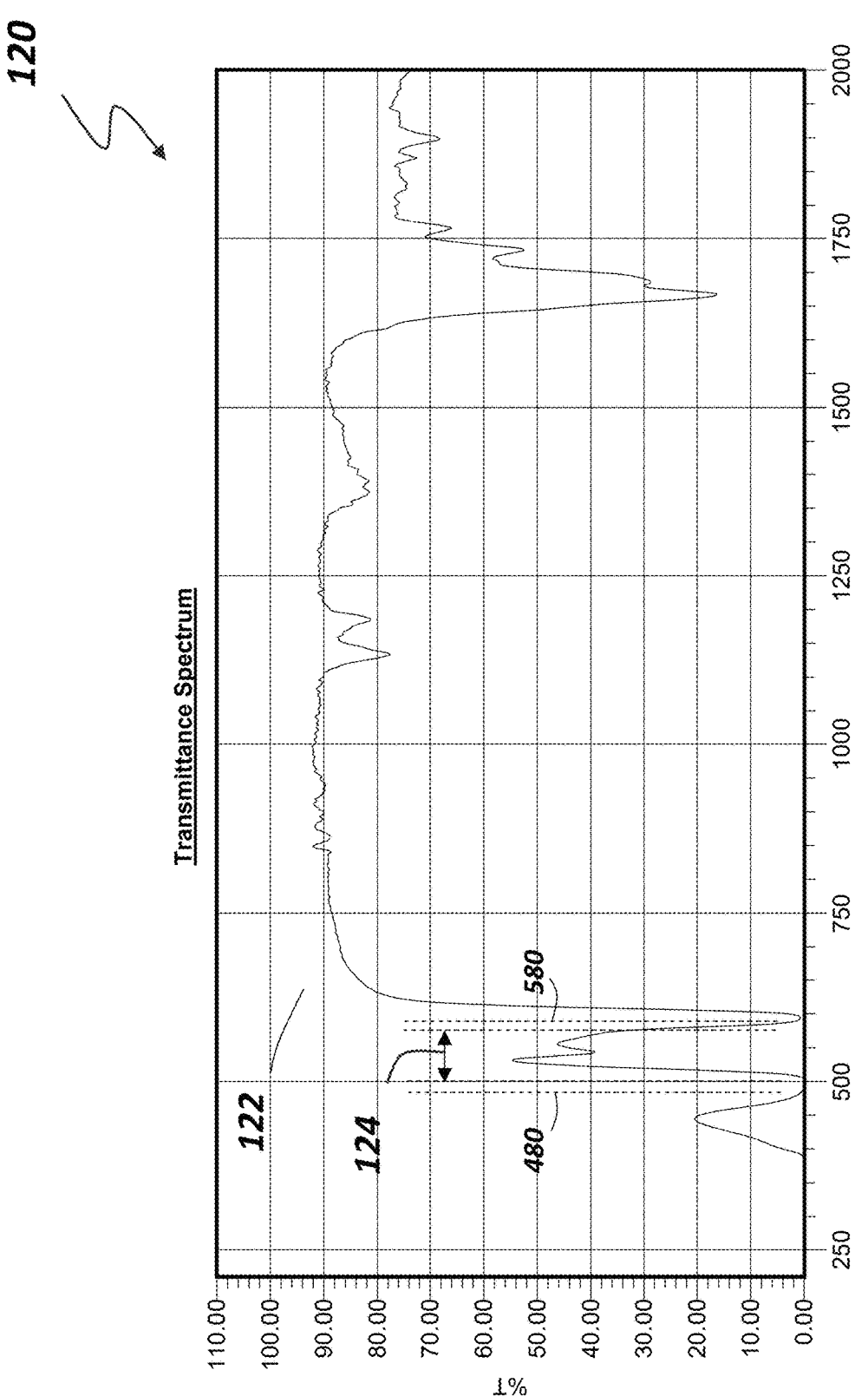

FIGS. 13 and 14 are graphs of the transmittance as a function of wavelength for lenses according to further aspects of the invention. FIGS. 13 and 14 includes graphs 110 and 120 of the transmittance as a function of wavelength according to another aspect of the invention. For example, graphs 110 in FIGS. 13 and 120 in FIG. 14 may be provided pursuant to ANSI Z80.3-2018, which is included by reference herein. The transmittance curve 112 of graph 110 of a lens according to aspects of the invention is shown in FIG. 13 and the transmittance curve 122 of graph 120 of a lens according to aspects of the invention is shown in FIG. 14. As indicated in FIGS. 13 and 14, the curves 112 and 122 represent the performance of lenses having a luminous transmittance, as known in the art, of about 33%, specifically about 33.5% and about 33.8%, respectively. The transmittance of the bandwidths of green light (500-570 nm) 114 and 124, respectively, and the wavelengths 480 nm and 580 that are characterized as having poor chromatic response are also shown for reference in FIGS. 13 and 14.

According to the aspect of the invention shown in FIGS. 13 and 14, in a fashion similar to the curves 72 and 82 shown in FIGS. 9 and 10, the lenses comprise a lens wafer and a compound, for example, one or more dyes, that enhances the transmission of light within the bandwidth of green light (500-570 nm) 114, 124, and may reduce the transmittance at the extremities of the bandwidths of green light (500-570 nm) 114, 124. For example, the compound reduces the transmittance at the extremities of the bandwidths of green light (500-570 nm) 114, 124 while providing less filtering between the extremities of the bandwidths of green light (500-570 nm) 114, 124. For example, in one aspect of the invention, lenses are provided that provide "gap filtering" in the bandwidths of green light (500-570 nm) 114, 124, for example, gap filtering at the extremities of the bandwidths of green light (500-570 nm) 114, 124. In one aspect, the compound according to aspects of the invention is configured to impart light transmittance characteristics such that the lens exhibits a light transmittance at 550 nm that is greater than 20%, and greater than the transmittance at 480 nm and greater than the transmittance at 580 nm. In another aspect, as shown in FIGS. 13 and 14, the lenses according to aspects of the invention may exhibit a light transmittance at 550 nm that is greater than 30%, or greater than 40%.

According to aspects of the invention, the content of the compound that yields the transmittance characteristics shown in FIGS. 13 and 14 may comprise at least one dye or a plurality of dyes. As disclosed above in the discussion of FIGS. 11 and 12, the one or more dyes that can be used to provide the transmittance shown in FIGS. 13 and 14, for example, limiting the transmittance at or about wavelengths 490 nm and 595 nm, may be selected from commercially-available dyes having the desired absorption spectra.

Figure 15:
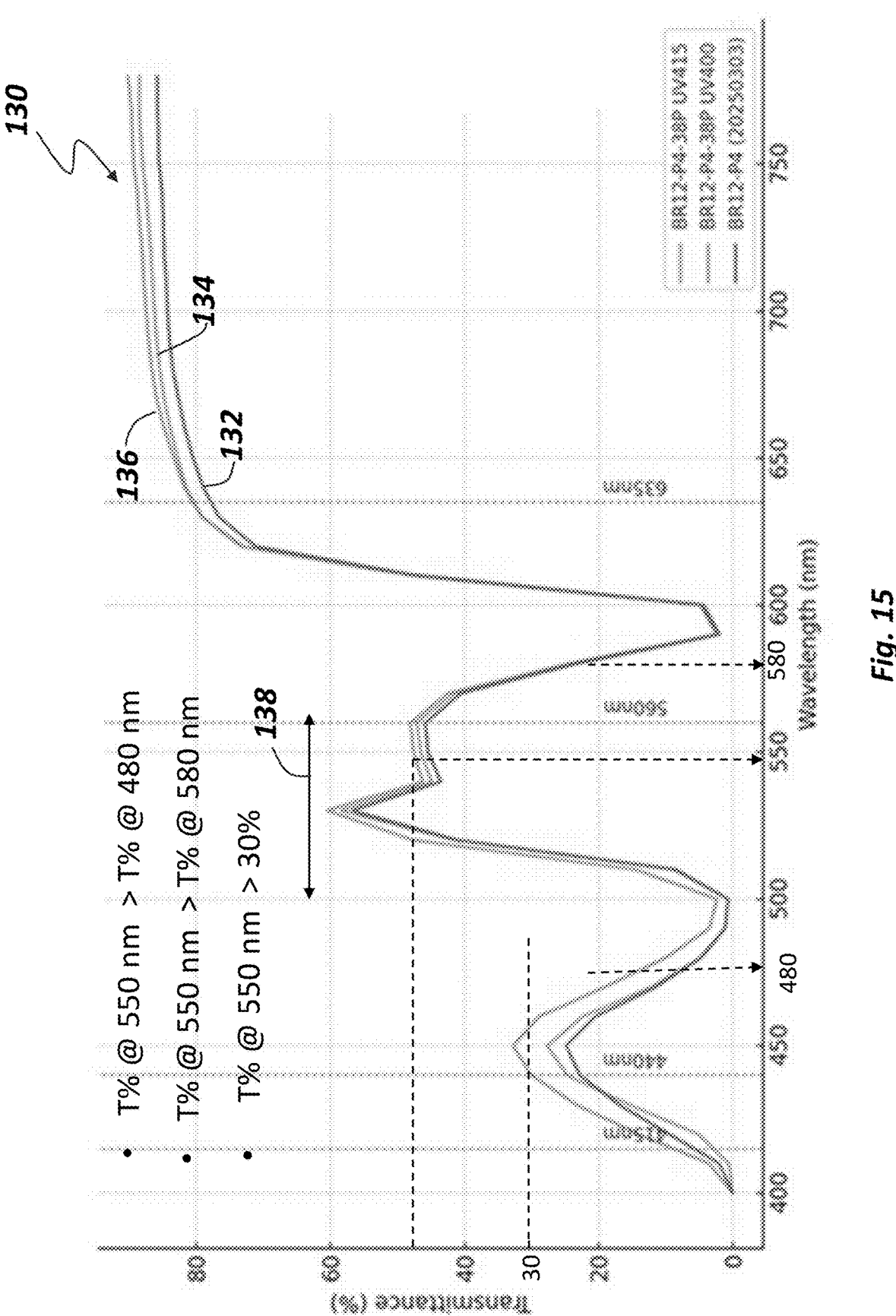
FIG. 15 is a graph of the transmittance as a function of wavelength according to further aspects of the invention.

FIG. 15 is a graph 130 of the transmittance as a function of wavelength of aspects of the invention as provided by prototype lenses according to an aspect of the invention. For example, graph 130 may be provided pursuant to ANSI Z80.3-2018, which is included by reference herein. Graph 130 includes three transmittance curves 132, 134, and 136 for three lenses according to aspects of the invention. The transmittance of the bandwidths of green light (500-570 nm) 138 and the wavelengths 480 nm and 580 that are characterized as having poor chromatic response are also shown for reference in FIG. 15.

In FIG. 15, the transmittance curve 132 represents the performance of a lens according to aspects of the invention having little or no UV filtering present in the compound introduced to or overlayed on the lens wafer. Curve 134 represents the performance of a lens according to aspects of the invention having a 415 UV filter in the compound, and curve 136 represents the performance of a lens according to aspects of the invention having a 400 UV filter in the compound. Among other things, the similarity of the shape of curves 132, 134, and 136 shown in FIG. 15 illustrate that the presence or absence of UV protection has little or no effect upon the transmittance performance of aspects of the invention.

According to the aspect of the invention shown in FIG. 15, in a fashion similar to the curves 92 and 102 shown in FIGS. 11 and 12, the lenses represented by curves transmittance curves 132, 134, and 136 comprise a lens wafer and a compound, for example, one or more dyes, where the compound provides less filtering, or relatively increased transmittance, between the extremities of the bandwidths of green light (500-570 nm) 138 and reduces the transmittance, or increases the filtering at the extremities of the bandwidths of green light (500-570 nm) 138. For example, in one aspect of the invention, lenses are provided that provide "gap filtering" in the bandwidths of green light (500-570 nm) 138, for example, gap filtering at the extremities of the bandwidths of green light (500-570 nm) 138. In one aspect, the compound according to aspects of the invention is configured to impart light transmittance characteristics such that the lens exhibits a light transmittance [T %] at 550 nm that is greater than 20%, and greater than the transmittance at 480 nm and greater than the transmittance at 580 nm. In another aspect, as shown in FIG. 15, the lenses may exhibit a light transmittance [T %] at 550 nm that is greater than 30%, or greater than 40%. According to aspects of the invention, the transmittance of light at or around 550 nm, that is, green light, may be enhanced and thus enhance the visual contrast experienced by the wearer of the lenses, for example, a golfer putting on the green grass of a golf green.

Close examination of the curves 132, 134, and 136 shown in FIG. 15 reveals that the transmittance of a lens according to aspects of the invention at between 500 nm and 570 nm, for example, at 550 nm, is greater than 30%, and even greater than 40%. For example, at 550 nm, the curves 132, 134, and 136 shown in FIG. 15 have a transmittance of about 46% to 50%. That is, according to one aspect of the invention, the transmittance of lenses between 500 nm and 570 nm, for example, at 550 nm, may be at least 5% transmittance more than the transmittance at 480 nm and/or the transmittance at 580 nm. In one aspect, the transmittance between 500 nm and 570 nm may be at least 10% transmittance or 15% transmittance more than the transmittance at 480 nm and/or the transmittance at 580 nm. It will be recognized by those of skill in the art that the above differences in transmittance percentages are differences in transmittance, or in transmittance percentage points. In other words, the percent differences stated are not in terms of percentages of the transmittances, but in differences in transmittance expressed as percentages.

According to aspects of the invention, the content of the compound that yields the transmittance curves 132, 134, and 136 shown in FIG. 15 may comprise at least one dye or a plurality of dyes. As disclosed above in the discussion of FIGS. 11 and 12, the one or more dyes that can be used to provide the transmittance shown in FIG. 15, for example, limiting the transmittance of the green light at the extremities of the bandwidth (500-570 nm) 138, may be selected from commercially-available dyes having the desired absorption spectra.

Method of Fabrication

According to aspects of the invention, the lenses having any of the desired transmittance characteristics disclosed herein may be fabricated by any conventional lens fabrication process. In one aspect, a lens according to aspects of the invention may be fabricated by combining the one or more dyes with a fluid polymer, such as, a fluid polycarbonate, to provide a substantially unform mixture of the fluid polymer and the one or more dyes. The one or more dyes, for example, the first dye and the second dye, may be introduced in the amount disclosed herein, for example, 0.01 to 1.0 g of dye per kg of fluid polymer. In one aspect, ultraviolet absorbers and/or light-stabilizing additives may be introduced to the mixture of fluid polymer and the one or more dyes, for example, to enhance durability and long-term optical performance of the fabricated lens.

The combining may be practiced by melt extrusion or mixing, for example, high-shear mixing or twin-screw mixing. After combining the fluid polymer, one or more dyes, and any additives, the fluid mixture may then be inserted into a mold having the desired shape of the lens or formed by casting. Prior to molding or casting, the fluid polymer, one or more dyes (for example, one or more dyes in a powdered form), and any additives mixture may be maintained at a temperature of between 240 to 300 degrees C., for example, to maintain dye stability. The insertion into a mold may be practiced by injection molding. Once molded or cast, the mixture is allowed to at least partially cure, for example, cool and solidify, to provide the desired lens or lens wafer. In one aspect, the mixture may be allowed to cure substantially completely. After molding or casting and curing, the lens may be heat treated to relieve internal stresses and/or to stabilize the spectral performance of the lens, as disclosed herein.

After molding or casting, and possible heat treatment, the lens or lens wafer may be subject to surface treatment, for example, one or more of hard-coating, anti-reflective coating, mirror coating, photochromic coating, and scratch-resistant coating as known in the art. One or more of the surface treatments may be applied to one or both sides of the lens. The lens may then be evaluated by standard spectrophotometric measurement to, for example, determine the transmittance as a function of wavelength, as indicated by the figures discussed herein.

As disclosed herein, lenses and eyewear having lenses exhibiting enhanced transmittance and/or reduction in the transmittance of green light (500-570 nm) are provided that can enhance the optical experience of various actives, including golfing; fishing; shooting; winter sports, such as, skiing, snowboarding, skeleton, and bob sledding; tennis; paddle sports, such as, racquetball and pickleball; biking; skate boarding; motor sports, such as, motor cycling, motocross, and auto racing; healthcare, such as, surgeons and ophthalmologists; and for the military, for police, and for first responders, among others. In some aspects, the lenses and eyewear disclosed herein, in addition to reducing or enhancing the transmittance of green light, may also allow or enhance, or reduce, the transmittance of blue light (450-500 nm), yellow-orange light (570-620 nm), and/or red light (620-740 nm).

The terminology used herein is for the purpose of describing particular embodiments only and is not intended to be limiting of the disclosure. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A lens comprising:
a lens wafer; and
a compound overlaying the lens wafer or embedded in the lens wafer, the compound comprising one or more dyes;
wherein the one or more dyes comprise a first dye adapted to limit light transmittance between 460 nm and 520 nm and a second dye adapted to limit light transmittance between 565 nm to 625 nm and are selected to impart light transmittance characteristics such that the lens exhibits a light transmittance at 550 nm that is greater than 30%, and greater than a transmittance at 480 nm and greater than a transmittance at 580 nm; and
wherein the first dye comprises 0.01 to 1 grams of dye per kilogram of the lens wafer and the second dye comprises 0.01 to 1 gram of dye per kilogram of the lens wafer.

2. The lens as recited in claim 1, wherein the first dye comprises 0.05 to 0.5 grams of dye per kilogram of the lens wafer and the second dye comprises 0.05 to 0.5 grams of dye per kilogram of the lens wafer.

3. The lens as recited in claim 1, wherein the first dye is adapted to limit light transmittance between 470 nm and 510 nm and the second dye is adapted to limit light transmittance between 575 nm and 615 nm.

4. The lens as recited in claim 3, wherein the first dye is adapted to limit light transmittance between 480 nm and 500 nm and the second dye is adapted to limit light transmittance between 585 nm to 605 nm.

5. The lens as recited in claim 1, wherein the one or more dyes are further adapted to provide a light transmittance at 700 nm greater than the light transmittance at 580 nm.

6. The lens as recited in claim 1, wherein the lens wafer comprises one of a polycarbonate, a polyamide, a polymethyl methacrylate, a cyclic olefin copolymer, and a bio-based thermoplastic.

7. The lens as recited in claim 1, wherein the one or more dyes are further adapted to provide the light transmittance at 550 nm that is at least 10% transmittance greater than the transmittance at 480 nm.

8. A lens comprising:
a polymer; and
one or more dyes embedded in the polymer;
wherein the one or more dyes comprise a first dye adapted to limit light transmittance between 460 nm and 520 nm and a second dye adapted to limit light transmittance between 565 nm to 625 nm and are selected to impart light transmittance characteristics such that the lens exhibits a light transmittance at 550 nm that is greater than 30%, and greater than a transmittance at 480 nm and greater than a transmittance at 580 nm; and
wherein the first dye comprises 0.01 to 1 grams of dye per kilogram of polymer and the second dye comprises 0.01 to 1 gram of dye per kilogram of polymer.

9. The lens as recited in claim 8, wherein the first dye comprises 0.05 to 0.5 grams of dye per kilogram of polymer and the second dye comprises 0.05 to 0.5 grams of dye per kilogram of polymer.

10. The lens as recited in claim 8, wherein the first dye is adapted to limit light transmittance between 470 nm and 510 nm and the second dye is adapted to limit light transmittance between 575 nm and 615 nm.

11. A method for enhancing perception of visual light, the method comprising:
receiving visual light on a surface of a lens comprising:
a lens wafer; and
a compound overlaying the lens wafer or embedded in the lens wafer;
wherein the compound is configured to impart light transmittance characteristics such that the lens exhibits a light transmittance at 550 nm that is greater than 30%, and greater than the transmittance at 480 nm and greater than the transmittance at 580 nm, and wherein the compound comprises a first dye adapted to limit light transmittance between 460 nm and 520 nm and a second dye adapted to limit light transmittance between 565 nm to 625 nm, and wherein the first dye comprises 0.01 to 1 gram of dye per kilogram of the lens wafer and the second dye comprises 0.01 to 1 gram of dye per kilogram of the lens wafer;
allowing the visual light to pass through the lens; and
with the lens, filtering at least some of the visual light passed through the lens to reduce a transmittance of a light bandwidth of 500 nm to 570 nm.

12. The method as recited in claim 11, wherein the first dye comprises 0.05 to 0.5 grams of dye per kilogram of the lens wafer and the second dye comprises 0.05 to 0.5 grams of dye per kilogram of the lens wafer.

13. The method as recited in claim 11, wherein the lens wafer comprises one of a polycarbonate, a polyamide, a polymethyl methacrylate, a cyclic olefin copolymer and, and a bio-based thermoplastic.

14. A lens comprising:
a lens wafer; and
a compound overlaying the lens wafer or embedded in the lens wafer, the compound comprising one or more dyes;

wherein the one or more dyes are selected to impart light transmittance characteristics such that the lens exhibits a light transmittance at 550 nm that is greater than 30%, and greater than a transmittance at 480 nm and greater than a transmittance at 580 nm, and provide a light transmittance at 450 nm greater than the light transmittance at 480 nm.

15. The lens as recited in claim 14, wherein the one or more dyes comprise a first dye adapted to limit light transmittance between 460 nm and 520 nm and a second dye adapted to limit light transmittance between 565 nm to 625 nm.

16. The lens as recited in claim 14, wherein the first dye comprises 0.01 to 1 grams of dye per kilogram of the lens wafer and the second dye comprises 0.01 to 1 gram of dye per kilogram of the lens wafer.

17. The lens as recited in claim 14, wherein the first dye comprises 0.05 to 0.5 grams of dye per kilogram of the lens wafer and the second dye comprises 0.05 to 0.5 grams of dye per kilogram of the lens wafer.

18. The lens as recited in claim 14, wherein the first dye is adapted to limit light transmittance between 470 nm and 510 nm and the second dye is adapted to limit light transmittance between 575 nm and 615 nm.

19. The lens as recited in claim 18, wherein the first dye is adapted to limit light transmittance between 480 nm and 500 nm and the second dye is adapted to limit light transmittance between of 585 nm to 605 nm.

20. The lens as recited in claim 14, wherein the one or more dyes are further adapted to provide a light transmittance at 700 nm greater than the light transmittance at 580 nm.

\* \* \* \* \*